Nov. 27, 1934.  H. A. CLARK  1,981,846
OIL SEAL
Filed March 17, 1932   2 Sheets-Sheet 1

Inventor:
Harold A. Clark,
By Romwel, Greist & Warden attys

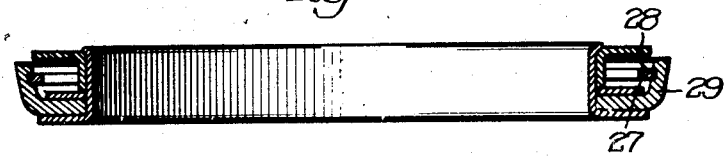
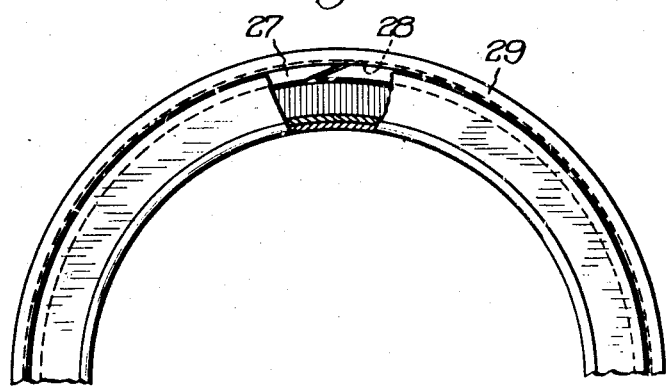
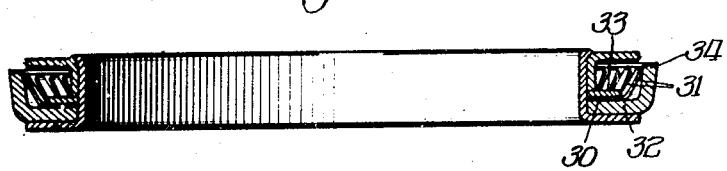
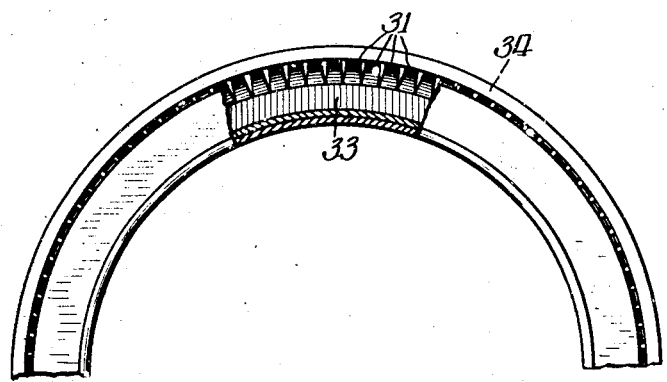

Patented Nov. 27, 1934

1,981,846

UNITED STATES PATENT OFFICE 1,981,846

OIL SEAL

Harold A. Clark, Northbrook, Ill.

Application March 17, 1932, Serial No. 599,526

3 Claims. (Cl. 288—1)

The object of this invention is to provide a self-contained sealing unit of novel construction which is adapted to be secured at its center to a shaft and is adapted to bear at its outer periphery against the inside of an encompassing housing in fluid-tight but freely rotatable engagement with the latter.

While the foregoing statement is indicative in a general way of the nature of the invention, other more specific objects and advantages will be apparent to those skilled in the art upon a full understanding of the construction, arrangement and coaction of the several parts which together constitute the sealing unit.

Several different forms of the invention are presented herein by way of illustration, but it will of course be understood that the invention is capable of being embodied in still other structurally modified forms coming equally within the scope of the appended claims.

In the accompanying drawings:

Figs. 4 and 5 are respectively a diametric section and a fragmentary face view of a modification in the spring means employed to distend the sealing flange; and Figs. 6 and 7 are also respectively a diametric section and a fragmentary face view of another modification in the spring means.

Figure 1:
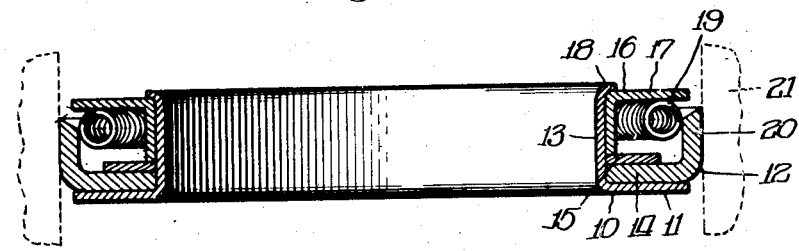
Fig. 1 is a diametric section through the seal, showing the flexible leather sealing flange or rim constricted slightly into the shape which it assumes when the seal is placed in operative position in a housing.
Figure 2:
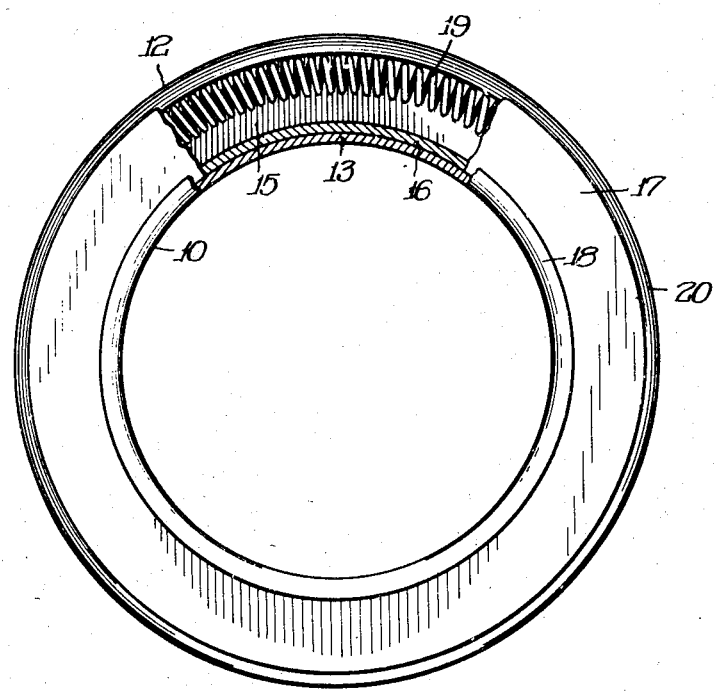
Fig. 2 is a face view of the same seal, with a portion of the sheet metal casing structure broken away to disclose the interior.

The sealing unit which is shown in Figs. 1 and 2 includes a cylindrical sheet metal stamping 10 which is provided at one end with an outwardly extending flange 11. The stamping 10 forms a part of the mounting for a cup-shaped flexible sheet leather packing 12, which packing is positioned about the cylindrical portion 13 of the stamping with the flat portion 14 of the packing in extended full face engagement with the flange 11. The portion 14 of the packing is held against the flange 11 by means of a flat washer 15. The washer 15 is held in firmly clamped engagement with the flat portion 14 of the packing by means of a second cylindrical sheet metal stamping 16 which is sleeved over the cylindrical portion 13 of the first stamping in firm abutment with the washer 15 at a point adjacent the inner periphery of the latter. The second stamping is provided at its opposite end with an outwardly extending flange 17, in spaced parallel relation to the flange 11, and the adjacent end 18 of the cylindrical portion of the first stamping is spun outwardly about the base of the flange 17, with the parts clamped together under a substantial axial pressure. An endless coil spring 19 is positioned in a radially compressed condition in the annular space between the washer 15 and the flange 17, in outwardly pressing resilient engagement with the inner surface of the rim 20 of the packing, at a point which is preferably closely adjacent the edge of the latter.

The rim 20 of the packing 14 is somewhat conical in form before the sealing unit is inserted within the housing 21 in which it is intended to operate. The act of inserting the unit in the housing, however, constricts the rim 20 a little, causing it to assume the more nearly cylindrical form shown in Fig. 1, with the result that such rim tends to expand as far as possible at all times when in service, both under the resiliency inherent in the leather and under the expansive action of the compressed spring 19. The unit is adapted to be fixedly secured to a shaft (not shown) which is located centrally within the housing, with the inner surface of the cylindrical portion 13 of the stamping 10 in fluid-tight, preferably forced fit, engagement with the shaft. In service, the rim 20 of the packing bears snugly against the inside of the housing 21 in flexibly conforming, fluid-tight, and freely rotatable engagement with the latter, thereby preventing passage of oil or other fluid past the sealing unit without in any way interfering with relative rotation between the shaft and housing.

Figure 3:
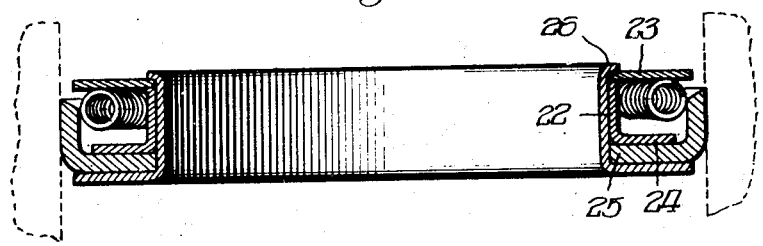
Fig. 3 is a view corresponding to Fig. 1, showing a modification in the casing structure.

In the modification shown in Fig. 3, the positions of the flanged sleeve 22 and washer 23 are reversed, the flange 24 on the sleeve being disposed against the flat portion 25 of the packing and the washer 23 being located with its inner edge between the outwardly spun edge 26 of the inside stamping and the adjacent edge of the sleeve 22.

In both of these forms it will be observed that the flat portion of the packing member is clamped between two sheet metal members throughout a relatively large area; that the spring means is caged within the space which is provided within the rim of the packing member between two sheet metal members; and that the cylindrical center bore in the unit for the reception of the shaft is of two-ply reinforced construction, all of which features are obtained with a minimum number of inexpensively produced parts.

In the modification shown in Figs. 4 and 5, the casing structure is the same as that shown in Figs. 1 and 2 but the spring means is different, consisting of an expansible split spring ring 27 which seats in a groove 28 which is formed in the inner face of the rim 29 of the packing at a point adjacent the edge of the rim.

In the modification shown in Figs. 6 and 7 a still different spring arrangement is shown. In this form a thin metal ring 30 with spring fingers 31 is provided. The ring proper is clamped between the flat portion 32 of the packing and the washer 33 with the fingers projecting outwardly at an angle beyond the washer into converging line contact with the inner face of the rim 34 of the packing.

I claim:

1. A self-contained seal for insertion as an assembled unit within a tubular housing in encompassing relation to a centrally located shaft, consisting of a cylindrical sheet metal sleeve which is adapted to be forced longitudinally onto the shaft to produce a pressed fit engagement with the latter, three spaced flanges extending outwardly from the sleeve, a cup-shaped leather packing arranged with the flat bottom portion thereof clamped between two of the flanges and with the rim portion thereof surrounding the annular space remaining between those two flanges and the third flange, and expanding means enclosed within said space in engagement with the inside surface of the rim portion of the packing.

2. A self-contained seal for insertion as an assembled unit within a tubular housing in encompassing relation to a centrally located shaft, consisting of a cylindrical sheet metal sleeve which is adapted to be forced longitudinally onto the shaft to produce a pressed fit engagement with the latter, three spaced flanges extending outwardly from the sleeve, a cup-shaped leather packing arranged with the flat bottom portion thereof clamped between two of the flanges and with the rim portion thereof surrounding the annular space remaining between those two flanges and the third flange, and expanding means enclosed within said space in engagement with the inside surface of the rim portion of the packing, said sleeve being of double-ply sheet metal construction throughout the greater portion of its length.

3. A preassembled sealing means for joints comprising in combination: a ring having a radially extending flange, said ring to be maintained in axial alignment with and adapted to be seated upon one of two telescopically related sections, a cup member of flexible material, as leather, having an opening in its center and adapted to bear at its outer face against an interior surface of the other of said sections, a ring member disposed against said cup member and having radially projecting spring portions to press the flange of said cup member against said surface, one of said members being seated against said flange, and means for clamping said parts in assembled relation.

HAROLD A. CLARK.